United States Patent
Müller et al.

(10) Patent No.: US 6,281,465 B1
(45) Date of Patent: Aug. 28, 2001

(54) DEVICE FOR PREDICTIVE DIAGNOSIS OF THE CURRENT QUALITY OF TECHNICAL PRODUCTION FROM A TECHNICAL INSTALLATION, PARTICULARLY OF THE CURRENT QUALITY OF WELDING POINTS OF A SPOT WELDING ROBOT

(75) Inventors: Klaus-Dieter Müller, Nürnberg; Martina Schubert, Altdorf, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/269,829

(22) PCT Filed: Sep. 19, 1997

(86) PCT No.: PCT/DE97/02122

§ 371 Date: Jun. 2, 1999

§ 102(e) Date: Jun. 2, 1999

(87) PCT Pub. No.: WO98/14300

PCT Pub. Date: Apr. 9, 1998

(30) Foreign Application Priority Data

Oct. 2, 1996 (DE) .............................................. 296 17 200

(51) Int. Cl.⁷ ............................ B23K 11/25; G05B 13/04
(52) U.S. Cl. ............................................. 219/109; 700/31
(58) Field of Search ................................... 219/109, 110; 700/29, 30, 31

(56) References Cited

U.S. PATENT DOCUMENTS 4,596,917  6/1986  Nied et al. .
5,408,405  4/1995  Mozumder et al. .

FOREIGN PATENT DOCUMENTS 34 21 522  12/1984  (DE) .
35 45 158   6/1987  (DE) .

(List continued on next page.)

OTHER PUBLICATIONS

Roland Keck, "Meβtechnik als Basis für 'Total Quality Management' in der Prozeβautomatisierung", atp–Automatisierungstechnische Praxis 36, 1994, 13, pp. S1–S4**.

Bernhard Lehmkuhl, et al., "Fortschritte in der Prozeβdatenerfassung und Prozeβdatenverarbeitung beim Widerstandspreβschweiβen", Schweiβen und Scheiden 42, 1990, H. 1, pp. 26–29.**

(List continued on next page.)

Primary Examiner—Clifford C. Shaw
(74) Attorney, Agent, or Firm—Kenyon & Kenyon

(57) ABSTRACT

A device for predictively diagnosing the prevailing quality of the technical work result of a technical installation, in particular, the prevailing quality of the welding spots of a welding robot. The device includes a device for cyclically acquiring sets of measured values, whose values influence the desired quality of the work result of the system, an installation model which uses sets of measured values of the installation to simulate an actual value for the prevailing quality of the work result of the installation, and a device at least for parameterizing the installation model. The parameterizing device includes a data base for storing selected sets of measured values and associated characteristic values, which are a measure for the quality of the work result of the installation, and the device generating and/or optimizing at least the parameters of the installation model by successively evaluating the sets of measured values and the associated characteristic quality values by an iterative optimization.

14 Claims, 2 Drawing Sheets

FOREIGN PATENT DOCUMENTS

| | | |
|---|---|---|
| 37 11 771 | 10/1988 | (DE) . |
| 41 12 985 | 10/1992 | (DE) . |
| 42 34 654 | 4/1994 | (DE) . |
| 42 44 014 | 7/1994 | (DE) . |
| 43 20 267 | 12/1994 | (DE) . |
| 195 18 804 | 12/1995 | (DE) . |
| 195 08 474 | 9/1996 | (DE) . |
| 0 534 221 | 3/1993 | (EP) . |
| 2 627 602 | 8/1989 | (FR) . |
| 2 724 744 | 3/1996 | (FR) . |
| 2 289 957 | 12/1995 | (GB) . |
| 03234190 | 3/1993 | (JP) . |
| 90/16048 | 12/1990 | (WO) . |

OTHER PUBLICATIONS

Jan Junze et al., "Ein Beispiel zur logikbasierten Prozeßdiagnose", atp Automatisierungstechnische Prazis 38, 1996, 5, pp. 26–34.**

Christian Schneider et al., "Vergleichende Untersuchung von Methoden analytischer Redundanz", at–Automatisierungstechnik 43, 1995, 10, pp. 484–489.**

S. Harfner et al., "Anwendungsstand Künstlicher Neuronaler Netze in der Automatisierungstechnik", atp–Automatisierungstechnische Praxis, 34 1992, 10, pp. 591–599.***

Michael Kaiser, "Artificial Neural Networks Principles and Applications", atp–Automatisierungstechnische Praxis 34, 1992, 9, pp. 539–545.***

Frank Bämann et al., "Prozeβregelung einer Nachreaktion auf der Basis eines künstlichen neuronalen Netzmodells", atp–Automatisierungstechnische Praxis 37, 1995, 8, pp. 36–43.**

Rolf Isermann, "Modellgestützte Überwachung und Fehlerdiagnose Technischer Systeme (Teil 1)", atp–Automatisierungstechnische Praxis 38, 1996, 5, pp. 9–20.**.

M. A. Javed, "Neural Networks Baswed Learning and Adaptive Control For Manufacturing Systems", IEEE/RSJ International Workshop on Intelligent Robots and Systems IROS '91 Nov. 3–5, 1991, Osaka Japan, IEEE. Cat. No. 91TH0375–6, pp.242–246.***

K. Matsuyama, "Recent Developments and Trends In Quality Control Technology For Resistance Welding", Welding Technique 1996 44 (4), 74–78***.

Robert W. Messler, Jr. et al., "An Intelligent Control System For Resistance Spot Welding Using A Neural Network and Fuzzy Logic", Record of the Industry Applications Conference (IAS), Oct. 8–12, 1995, Bd. 2, Oct. 8, 1995, Institute of Electrical and Electronics Engineers, pp. 1757–1763.***

DEVICE FOR PREDICTIVE DIAGNOSIS OF THE CURRENT QUALITY OF TECHNICAL PRODUCTION FROM A TECHNICAL INSTALLATION, PARTICULARLY OF THE CURRENT QUALITY OF WELDING POINTS OF A SPOT WELDING ROBOT

FIELD OF THE INVENTION

The present invention relates to a device and method for predictively diagnosing the prevailing quality of the technical work result of a technical installation, in particular, the prevailing quality of the welding spots of a spot-welding robot.

BACKGROUND INFORMATION

In practice, it can be extremely difficult to determine the prevailing quality of the prevailing technical work result of a technical installation, in particular, a production plant. In contrast to determining physical quantities using measuring techniques, in many cases there are no common direct measuring methods available for determining the quality parameters of production results, In some cases, there is success in assembling a highly specialized, complex measuring arrangement which, for instance, is based on radiological, electromagnetic or optical principles or a combination thereof. Many times, however, it is still necessary for the prevailing quality parameters to be subjectively determined by experienced operating personnel, for example, within the framework of a "quality control."

This produces a multitude of disadvantages. First of all, the determination of quality parameters by experienced operating personnel is neither representative nor reproducible. Rather, assessments of this kind vary even in the short term, depending on the operating personnel employed and their respective daily condition. Furthermore, operating personnel can generally only carry out evaluations of quality parameters on selected production results of the respective installation by taking random samples. A temporary absence or a change of "experienced operating personnel", for example, make it impossible to prevent unreproducible assessment variations in the long term, as well.

Secondly, exceptional outlay is required to be able to use the quality parameters, gained from the assessments by the operating personnel, along the lines of open-loop or closed-loop control engineering in the form of control variables or adjusted setpoint values for influencing the operational performance of the respective technical installation. Particularly in the case of high-speed, possibly fully automatic production plants, it is almost impossible in practice for the characteristic quality values, gained from random samples, to be made usable sufficiently quickly to influence the operational equipment of the technical installation.

In an article entitled "Recent Developments and Trends In Quality Control Technology For Resistance Welding, " by K. Matsayuma, the possibility of continuously determining specific parameters for resistance welding during a welding described. Also mentioned in the possibility of determining the parameters with the aid of a neural network.

In another article entitled "An Intelligent Control System for Resistance Spot Welding Using A Neural Network And Fuzzy Logic" by R. W. Messler, an intelligent control system is described, which is based on fuzzy logic and is used for compensating variations and faults during the automatic resistance welding operation.

SUMMARY

An object of the present invention is to provide a device and a method for predictively diagnosing the prevailing quality of the technical work result of a technical installation, by which it is possible to determine the quality of a technical work result in a reproducible way.

DETAILED DESCRIPTION

Figure 1:
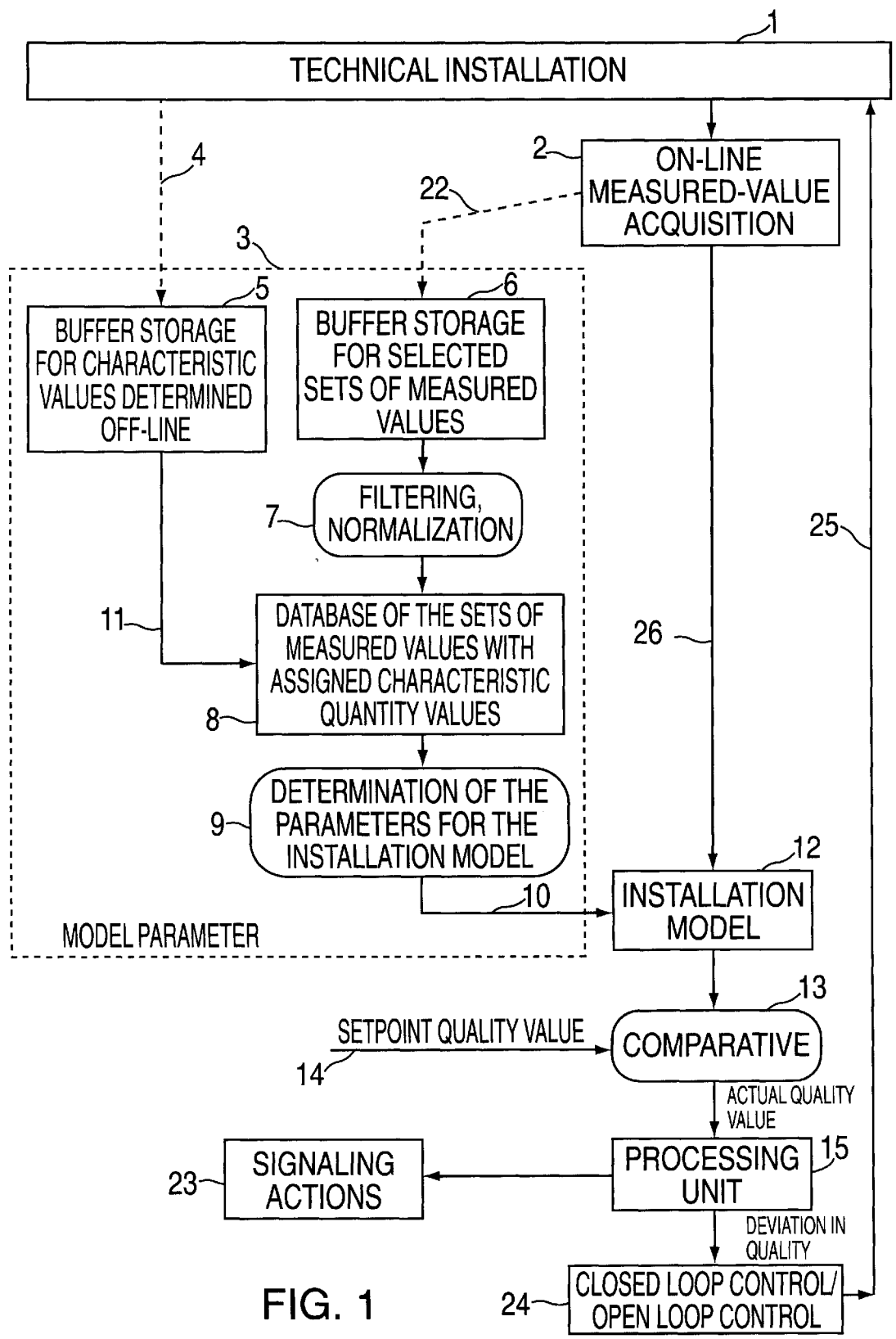
FIG. 1: shows a block diagram of the diagnostic device according to the present invention.

The basic design of a device, designed according to the present invention, for predictively diagnosing the prevailing quality of the technical working result of a technical installation is further explained on the basis of the block diagram in FIG. 1. As a general principle, any technical facility by which solid, liquid and/or gaseous starting materials are worked, processed or converted into a changed or new product can be considered a technical installation 1 in which a device for diagnosing the quality according to the present invention can be employed.

The predictive diagnostic device according to the present invention includes a device 2 for acquiring sets of measured values of technical installation 1. Active measured values, for example, of operational equipment and materials in the installation whose active values affect the desired quality of the technical work result at the issue output of technical installation 1, are acquired during the operation of the installation, i,e., on-line.

The sets of measured values, which are mostly acquired cyclically at points of time predefined in a time-discrete manner, are forwarded to an installation model 12, and also to a device 3 which is used at least for the parameterization of installation model 12. Installation model 12 uses the active sets of measured values of technical installation 1, preferably available cyclically, to permanently simulate an actual value for the prevailing quality of the technical work result of technical installation 1. This actual quality value at the output of installation model 12 can be used for many purposes.

In the example of FIG. 1, the actual quality value is compared in a comparator 13 to a predefined setpoint quality value 14. A possibly resulting deviation in quality can be advantageously forwarded to an additional processing unit 15. This processing unit can trigger signaling actions 23, informing, e.g., the operating personnel of the currently existing deviation in quality. It is particularly advantageous if the active values of the deviation in quality are fed either directly or in an adapted form to a closed-loop or open-loop control system 24. This control system, in turn, can derive therefrom specific actuating signals 25 for technical installation 1, whereby its operating equipment can be adapted in such a way that the active actual quality value at the issue of installation model 1 is adapted to the predefined quality setpoint value as quickly as possible, and that the deviation in quality consequently becomes zero if possible.

From the measured values cyclically acquired by measured-value acquisition 2, selected sets of measured values are diverted and forwarded to a further device 3 which is used at least for parameterizing installation model 12. In the example of FIG. 1, this device 3 is represented by a dash-lined arrow provided with reference symbol 22. The selected sets of measured values, after a possible temporary storage in an additional buffer storage 6 and a possible signal processing in a filter and normalization device 7, are fed to a "data base"8. In this context, the sets of measured values are selected from the stream of measured values provided on-line by measured-value acquisition 2 under the condition that the active characteristic value, existing in the moment when a selectable set of measured values appears, for the quality of the respective work result of the technical installation can be acquired. For example a work result, e.g., a workpiece from a production plant, which corresponds to a selected set of measured values, may be taken out and analyzed, for example, in a lab examination. The characteristic values 4, which ensue as examination results and represent a measure for the respective quality of the technical work result of technical installation 1, are also forwarded to data base 8 after a possible intermediate storage in a storage 5. In the example of FIG. 1, this is represented by a connection provided with reference symbol 11.

In data base 8, the selected sets of measured values and the respective appertaining characteristic quality values are systematically filed in groups. In an evaluator 9, at least the parameters of the installation model are generated and/or optimized by a successive evaluation of the sets of measured values 2 and the appertaining characteristic quality values by an iterative optimization. Device 3 for parameterizing installation model 12 is advantageously designed in the form of a neural network. If desired, device 9 can also be designed in such a way that a generation of the logical structure of the installation model also is carried out, for example, by iterative evaluation of the individual groups of related sets of measured values and characteristic quality values.

Figure 2:
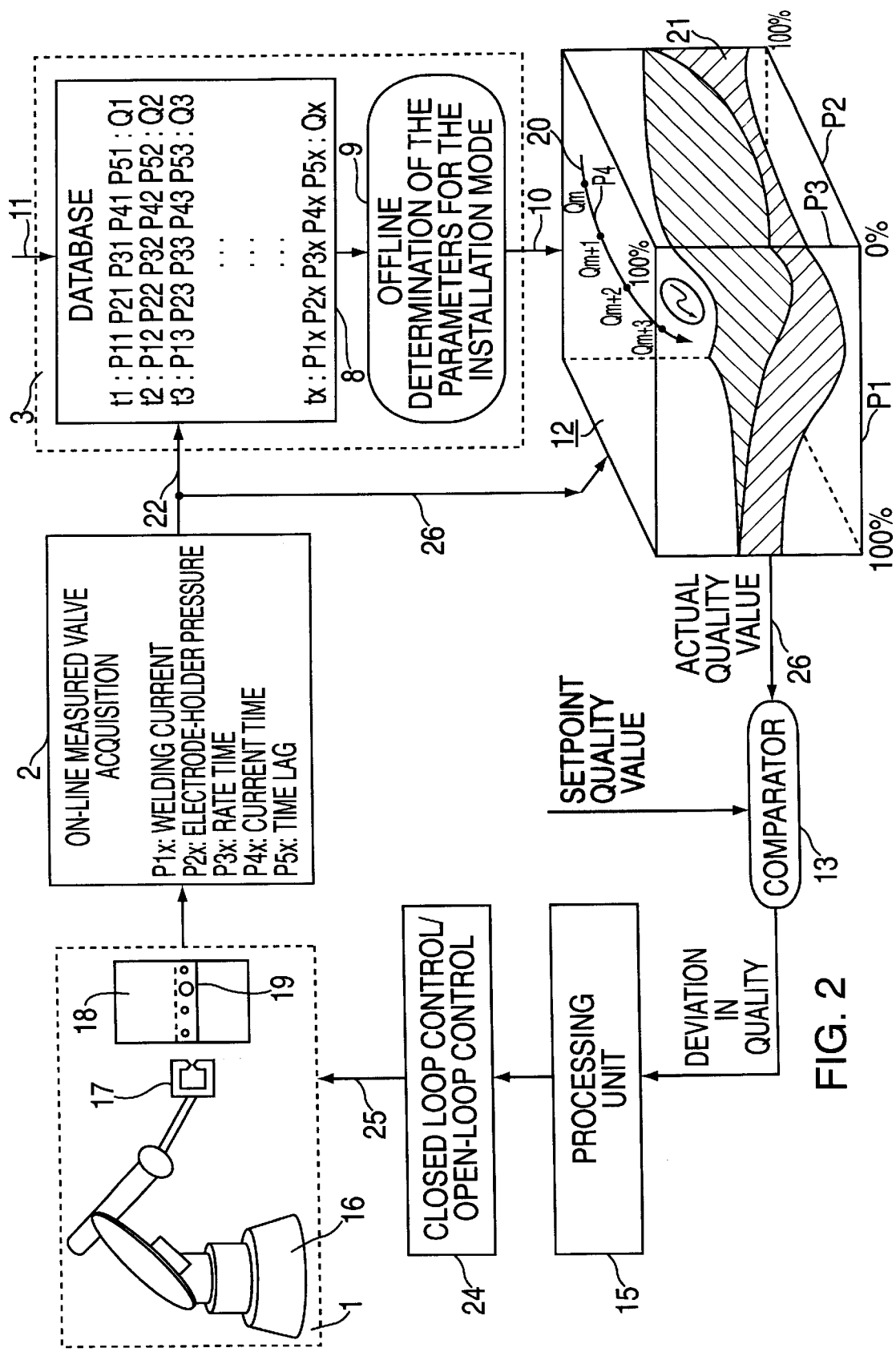
FIG. 2: shows a block diagram of a device, designed according to the present invention, for predictively diagnosing the prevailing quality of the welding spots of a spot-welding robot.

FIG. 2 shows a schematic representation of a device designed according to the present invention for predictively diagnosing the prevailing quality of the welding spots of a spot-welding robot. In this context, the spot-welding device, by way of example, is a technical installation 1, whose work results, i.e., the quality of its welding spots, can be determined with the aid of the diagnosing device according to the present invention. The installation may include at least one automatic handling device 16 for positioning electrode holders 17. With this means, welding spots are placed, controlled by a program, on, for example, a sheet-metal-like work 18 to be welded. The technological parameters for classifying the technical quality of welding spots 19 can include, for example, the diameter of the raised head part of the welding spots and the color distribution on their surface, e.g., in the gradations of dark, medium and light gray. For example, the technological quality of welding spots can be assigned to the classes "good, adequate, poor and inadequate."

In the application of FIG. 2, a device 2 for acquiring sets of measured values whose active values influence the desired quality of the welding spots of the spot-welding robot, is connected to the technical installation. In this context, the sets of measured values include at least the prevailing values of welding current P1x and of electrode-holder pressure P2x of spot-welding robot 1. The identification character x in the designations P1x and P2x is intended to indicate that the measured values are acquired cyclically at preferably equidistant instants tx. Therefore, viewed over a longer period of time, chains of values per measuring parameter ensue, i.e., for each of the instants t1, t2, t3 . . . tx, for example, a measured value P11, P12, P13 . . . P1x for the welding current and, for example, a measured value P21, P22, P23 . . . P2x for the electrode-holder pressure. On the one hand, these sets of measured values, acquired on-line, are fed via data line 22 to device 3 which is used for generating and parameterizing installation model 12, and, on the other hand, via data line 26 to installation model 12 itself.

Device 3 for generating and parameterizing installation model 12 in FIG. 2, in turn, has a data base 8 which is used for storing sets of measured values 2 and associated characteristic values, which are a measure for the respective quality of welding spots 19 of spot-welding robot 16, 17. In the data base, a complete set of measured values P1x, P2x . . . together with an associated characteristic quality value Q1, Q2, Q3 . . . Qx are stored for each acquisition instant t1, t2, t3 . . . tx. In the example shown in FIG. 2, welding current P1x, electrode-holder pressure P2x, a "rate time" P3x for the increase of the welding current, a "current time" P4x for the duration of the constant value of the welding current and a "time lag" P5x for the drop of the welding current are acquired as measured values being the technological parameters which influence the quality of welding spots. Accordingly, for each acquisition instant t1, t2, t3 . . . tx, a complete set of these measured values, i.e., P11, P21, P31, P41, P51 . . . P1x, P2x, P3x, P4x, P5x is stored in the data base together with the appertaining characteristic quality value Q1, Q2, Q3 . . . Qx. These groups of values can also be referred to as "cases".

The characteristic quality values belonging to a set of measured values can be determined, for example, by a testing person located near the spot-welding robot, or by an automatic testing device which, for example, is provided with a video camera having an evaluator connected to it, or by a button test of welding spot specimens within the framework of a destructive workpiece test in a laboratory. In the example of FIG. 2, the characteristic quality values are input into data base 3 via data line 11.

By successively evaluating the sets of measured values kept available in the data base and the appertaining characteristic quality values, in a following evaluator 9 in an "off-line" process, i.e., not in step with the preferably cyclic online acquisition of the sets of measured values, at least the parameters of the installation model can be generated by an iterative optimization. Depending on the capacity of the algorithm used for the iteration, and the structure of the installation model, respectively, it may also be possible that the structure of the installation model itself is optimized and adjusted adaptively to changes in the sets of measured values. For example, the installation model can be designed in the form of a "neural network", or it is possible to use evolutionary strategies or "cluster processes" for the iteration.

In the example of FIG. 2, the determined parameters are forwarded via data line 10 to installation model 12. This installation model can now, quasi in the form of an on-line converter, simulate a characteristic value Qm, Qm+1, Qm+2, Qm+3. . . for the prevailing quality of the welding spots of spot-welding robot 16, 17, from the active sets of measured values of technical installation 1 being cyclically forwarded via data line 26. Therefore, actual values for the quality of the technical work result are available at the issue of installation model 12, these values being able to be used in closed-loop or open-loop control engineering for influencing the operating mode of the spot-welding robot.

As a function of the number n of measured values provided in the measured-value acquisition 2, the installation model can be regarded as a dimensional structure of values corresponding to n. In the example of FIG. 2, such a structure is shown by way of example for an arrangement having four measured values P1 . . . P4. Consequently, in this structure, ranges of values result for the actual quality value Qm. These are identified in FIG. 2 by diagonal hatchings. Thus, for example, 21 designates a "critical range", characteristic quality values having unwanted values being assigned to sets of values included therein, according to the prediction by the installation model.

It is decisive for the accuracy of the installation model, and the determination of characteristic quality values made possible by it, that, depending on the respective technological process, as many relevant measured values of the technical installation as possible are cyclically acquired.

Thus, it is advantageous in the case of spot-welding units that the sets of measured values, whose active values influence the desired quality of the welding spots of the spot-welding robot, additionally include values which characterize the pressure build-up at the electrode holders of spot-welding robot 16. The measured value of electrode-holder pressure P2x of the spot-welding robot is advantageously simulated by measuring the air pressure in a pneumatic drive of the electrode holders.

Furthermore, the quality of welding spots is particularly influenced by values which characterize the curve of the welding current of the spot-welding robot. Therefore, it is advantageous if the sets of measured values include characteristic values for the "rate time" in the curve of the welding current, i.e., the current rise time, for the "current time" in the curve of the welding current, i.e., the phase of constant and maximum welding current, and for the "time lag" in the curve of the welding current.

Furthermore, the quality of welding spots is particularly influenced by values which characterize temperature progressions occurring during the spot-welding operation. Therefore, it is advantageous if the sets of measured values additionally include characteristic values for a temperature of a cooling medium of the welding helmets at the electrode holders of the spot-welding robot. Finally, values characterizing an inlet and/or a return temperature of a cooling medium for welding helmets at the electrode holders of spot-welding robot (16) can permit conclusions about the prevailing quality of the instantaneous technical work result.

What is claimed is:

1. A device for predictively diagnosing a prevailing quality of a technical work result of a technical installation, comprising:
    a first device cyclically acquiring sets of measured values during operation of the technical installation, the active values influencing a desired quality of the technical work result of the technical installation;
    an installation model simulating an actual value for the prevailing quality of the technical work result of the technical installation using at least one active one of the acquired sets of measured values; and
    a second device parameterizing the installation model, the second device including a database for storing selected ones of the acquired sets of measured values, and characteristic quality values determined as an examination result, the characteristic quality values being a measure for the respective quality of the technical work result of the technical installation, and an evaluator successively evaluating the measured values and the characteristic quality values by an iterative optimization, the evaluator further determining parameters of the installation model.

2. The device according to claim 1, wherein the second device includes a neural network.

3. The device according to claim 1, wherein the technical installation is a spot-welding robot, the technical work result is welding spots of the spot-welding robot, and the acquired sets of measured values include at least active values of a welding current and active values of a pressure of the electrode-holder of the spot-welding robot.

4. The device according to claim 3, wherein the measured value of the pressure of the electrode-holder of the spot-welding robot is simulated by measuring an air pressure in a pneumatic drive of the electrode holder.

5. The device according to claim 3, wherein the acquired sets of measured values further include values which characterize a pressure buildup at the electrode holder of the spot-welding robot.

6. The device according to claim 3, wherein the acquired sets of measured values further include values which characterize a curve of the welding current of the spot-welding robot.

7. The device according to claim 3, wherein the acquired sets of measured values further include values which characterize a rate time in a curve of the welding current of the spot-welding robot.

8. The device according to claim 3, wherein the acquired sets of measured values further include values which characterize a time lag in a curve of the welding current of the spot-welding robot.

9. The device according to claim 3, wherein the acquired sets of measured values further include values which characterize a current time in a curve of the welding current of the spot-welding robot.

10. The device according to claim 3, wherein the acquired sets of measured values further include values which characterize a temperature of a cooling medium for welding helmets at the electrode holder of the spot-welding robot.

11. The device according to claim 3, wherein the acquired sets of measured values further includes values which characterize at least one of an inlet and a return temperature of a cooling medium for welding helmets at the electrode holder of the spot-welding robot.

12. The device according to claim 1, wherein an actual quality value is provide at an issue output of the installation model, the actual quality value being compared to a predetermined quality setpoint value in a comparator for determining a deviation in quality.

13. The device according to claim 12, further comprising:
    a processing unit, the deviation in quality being fed to the processing unit for at least one i) triggering a signaling action, ii) signaling the deviation in quality, and iii) deriving actuating signals for the technical installation.

14. A method for predictively diagnosing a prevailing quality of a technical work result of a technical installation, comprising the steps of:
    cyclically acquiring sets of measured values during an operation of the technical installation, the measured values including active values which influence a desired quality of the technical work result of the technical installation;
    simulating an actual value for the prevailing quality of the technical work result of the technical installation using at least one of the sets of measured values; and
    parameterizing an installation model, including the steps of
        storing in a database selected sets of the measured values, and characteristic quality values determined as an examination result, the characteristic quality values being a measure for the respective quality of the technical work result of the technical installation, and
        successively evaluating by an iterative optimization the sets of measured values and associated ones of the characteristic quality values, and determining parameters of the installation model as a function of the successive evaluations.

* * * * *